United States Patent
Russell et al.

(10) Patent No.: US 9,426,106 B2
(45) Date of Patent: *Aug. 23, 2016

(54) APPARATUS, SYSTEMS AND METHODS FOR FACILITATING SOCIAL NETWORKING VIA A MEDIA DEVICE

(71) Applicant: EchoStar Technologies L.L.C., Englewood, CO (US)

(72) Inventors: Mary J. Russell, Lakewood, CO (US); Thomas Gregory Bradberry, Suwanee, GA (US)

(73) Assignee: EchoStar Technologies L.L.C., Englewood, CO (US)

( * ) Notice: Subject to any disclaimer, the term of this patent is extended or adjusted under 35 U.S.C. 154(b) by 129 days.

This patent is subject to a terminal disclaimer.

(21) Appl. No.: 14/320,106

(22) Filed: Jun. 30, 2014

(65) Prior Publication Data
US 2014/0317535 A1    Oct. 23, 2014

Related U.S. Application Data

(63) Continuation of application No. 13/104,676, filed on May 10, 2011, now Pat. No. 8,769,422.

(51) Int. Cl.
| | |
|---|---|
| *G06F 3/00* | (2006.01) |
| *H04L 12/58* | (2006.01) |
| *H04N 21/475* | (2011.01) |
| *H04N 21/4788* | (2011.01) |
| *H04N 21/482* | (2011.01) |

(52) U.S. Cl.
CPC .......... *H04L 51/046* (2013.01); *H04N 21/4756* (2013.01); *H04N 21/4788* (2013.01); *H04N 21/4826* (2013.01)

(58) Field of Classification Search
CPC ............................ H04L 51/04; H04N 21/4788
See application file for complete search history.

(56) References Cited

U.S. PATENT DOCUMENTS

| | | |
|---|---|---|
| 7,895,625 B1 | 2/2011 | Bryan et al. |
| 8,060,827 B2 | 11/2011 | Fischer et al. |
| 2006/0174277 A1 | 8/2006 | Sezan et al. |
| 2008/0052742 A1 | 2/2008 | Kopf et al. |
| 2008/0229215 A1 | 9/2008 | Baron et al. |
| 2009/0100469 A1 | 4/2009 | Conradt et al. |

(Continued)

FOREIGN PATENT DOCUMENTS

| | | |
|---|---|---|
| EP | 2299709 A2 | 3/2011 |
| EP | 2355498 A1 | 8/2011 |

(Continued)

*Primary Examiner* — Omar Abdul-Ali
(74) *Attorney, Agent, or Firm* — Lowe Graham Jones PLLC

(57) ABSTRACT

Techniques for facilitating social networking via a media device are described. Some embodiments provide a social networking facilitator ("SNF") as part of a media device, such as a set-top box that is configured to receive media content events from a broadcast system, such as a satellite broadcast system. As the media device presents a media content event, a user can share, via the SNF, information about the presented media content event with members of his social network. In particular, the SNF prepares a message that includes information about or from the presented media content event, such as a title, a channel, a summary, rating, video clip, or the like. This message can then be edited by the user, such as by adding a comment or rating, before being transmitted by the SNF a social networking system, to be forwarded as a notification to members of the user's social network.

20 Claims, 9 Drawing Sheets

(56) References Cited

U.S. PATENT DOCUMENTS

| | | |
|---|---|---|
| 2009/0106700 A1 | 4/2009 | Nobori et al. |
| 2009/0193463 A1 | 7/2009 | Choi et al. |
| 2009/0233593 A1 | 9/2009 | Ergen et al. |
| 2009/0233715 A1 | 9/2009 | Ergen et al. |
| 2010/0037277 A1 | 2/2010 | Flynn-Ripley et al. |
| 2011/0067070 A1 | 3/2011 | Choi et al. |
| 2011/0119595 A1 | 5/2011 | Bydeley et al. |
| 2011/0126251 A1 | 5/2011 | Lafreniere et al. |
| 2011/0194833 A1 | 8/2011 | Jong |
| 2012/0005702 A1 | 1/2012 | Tindell |
| 2012/0159337 A1 | 6/2012 | Travilla et al. |
| 2012/0174157 A1 | 7/2012 | Stinson, III et al. |

FOREIGN PATENT DOCUMENTS

| | | |
|---|---|---|
| WO | 2005029859 A1 | 3/2005 |
| WO | 2009030775 A1 | 3/2009 |

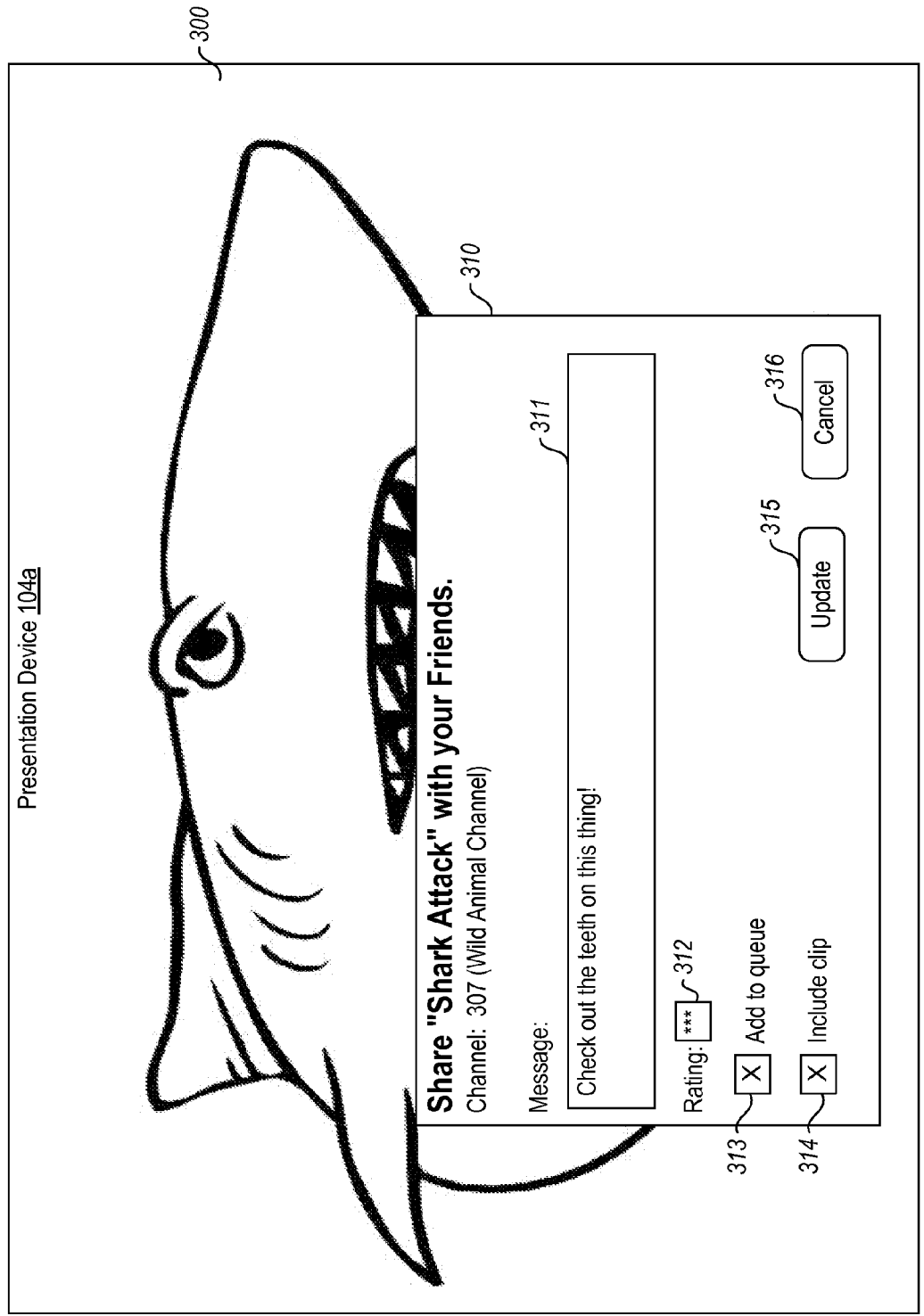

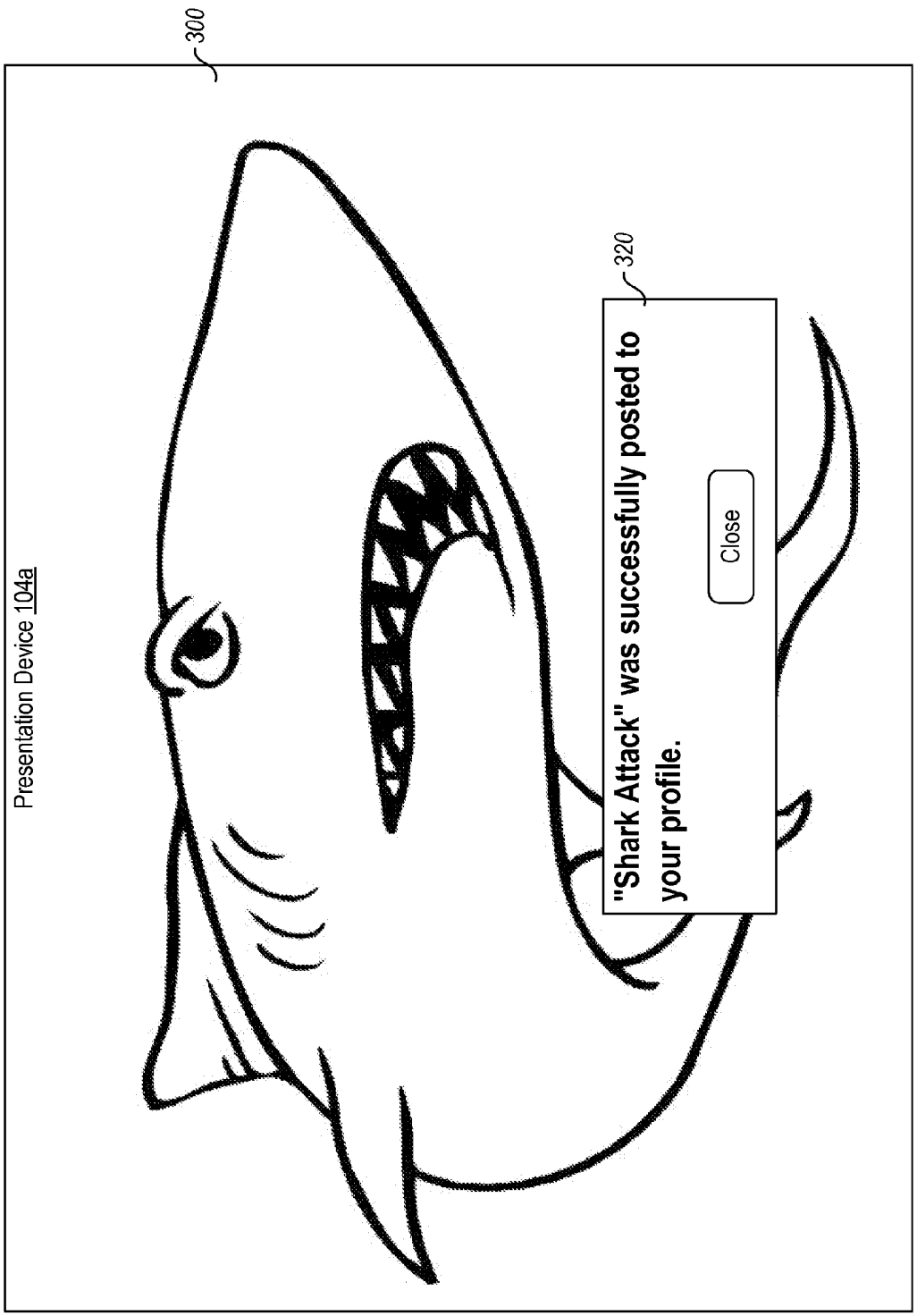

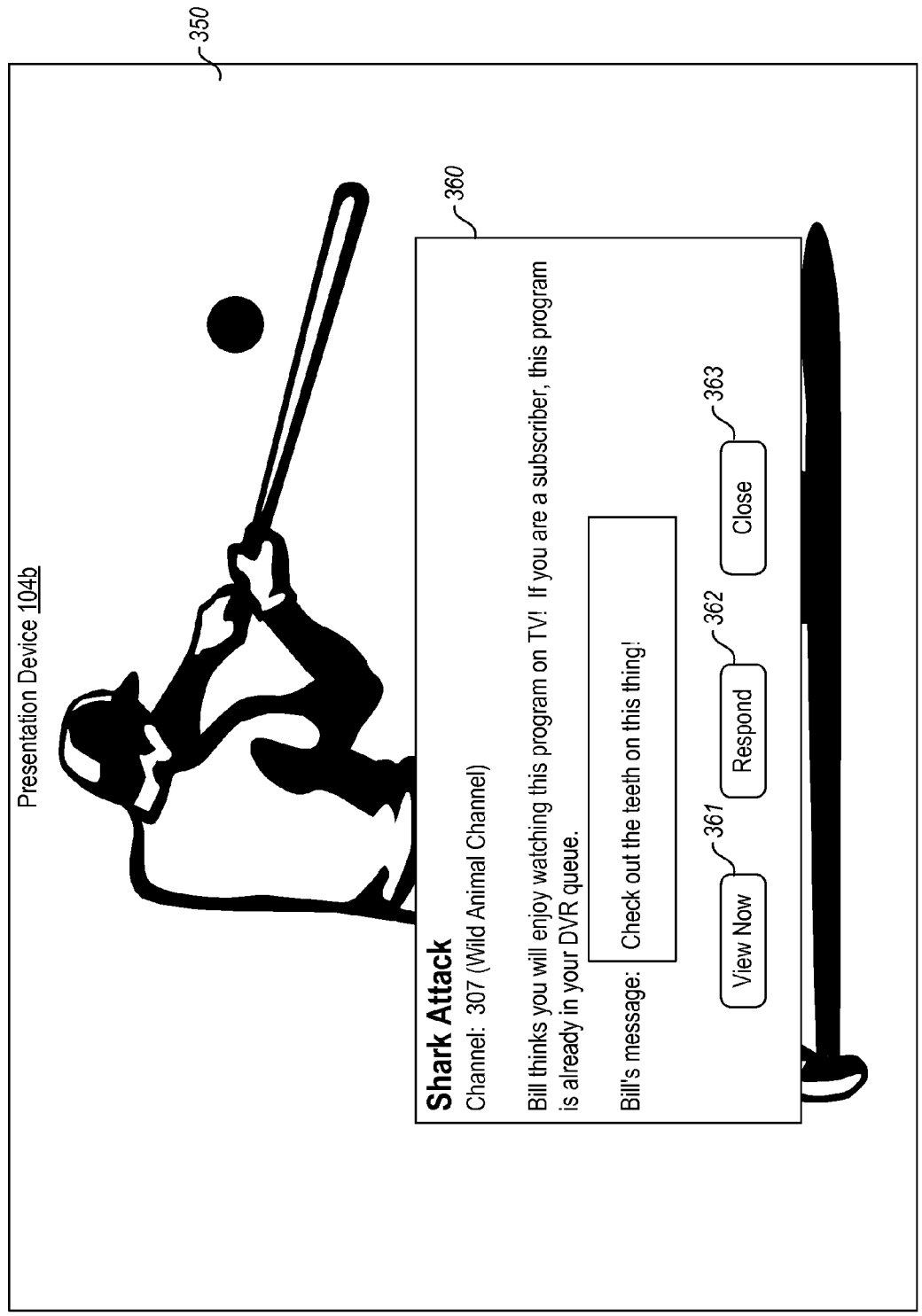

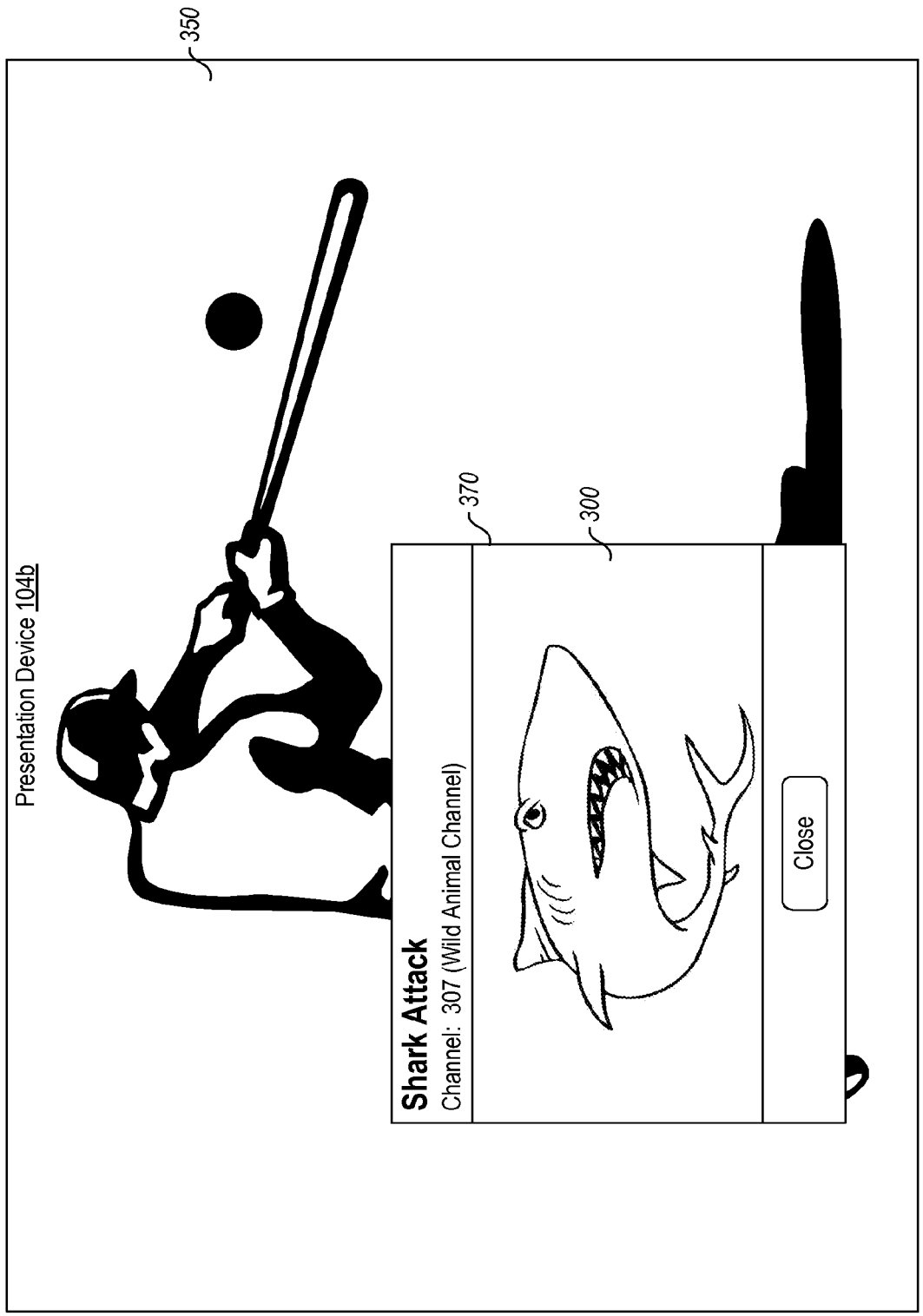

APPARATUS, SYSTEMS AND METHODS FOR FACILITATING SOCIAL NETWORKING VIA A MEDIA DEVICE

PRIORITY CLAIM

This patent application is a Continuation of U.S. Non-Provisional patent application Ser. No. 13/104,676, filed May 10, 2011, published as U.S. Publication No. 2012/0290953, entitled "APPARATUS, SYSTEMS AND METHODS FOR FACILITATING SOCIAL NETWORKING VIA A MEDIA DEVICE," and issued as U.S. Pat. No. 8,769,422 on Jul. 1, 2014, the content of which is incorporated herewith in its entirety.

BACKGROUND

Social networking systems represent networks of people or organizations that are related to one another as friends, colleagues, acquaintances, or the like. Such social networking systems facilitate communication and information sharing between members of a network, such as by providing facilities for sending messages, sharing information, updating a personal profile, and the like.

Social networking has become increasingly integrated into the online user experience, particularly in the context of the World-Wide Web ("the Web"). For example, many Web pages now include buttons or other user interface controls that are operable by a user to "share" a Web page, such as by informing members of the user's social network about the Web page.

Unfortunately, social networking is not well-integrated into the broadcast television medium. For example, if a user wishes to inform members of his social network about a television program, the user typically must utilize a separate device, such as a smart phone or laptop computer, to interact with the appropriate social networking system and manually enter information about the program.

SUMMARY

Systems and methods for facilitating social networking via a media device are disclosed. An exemplary embodiment receives from a broadcast system program data that represents a media content event and information about the media content event; automatically populates a message with at least some of the obtained program data; and causes the social networking system to notify members of a social network of the user about the media content event, by transmitting the message to the social networking system.

BRIEF DESCRIPTION OF THE DRAWINGS

Preferred and alternative embodiments are described in detail below with reference to the following drawings:

FIGS. 3A-3E illustrate example user interface screens provided by example embodiments;

DETAILED DESCRIPTION

Example embodiments described herein facilitate social networking via a media device. Some embodiments provide a social networking facilitator that executes on a media device that is configured to receive media content events, such as television shows or movies, from a broadcast system, such as a cable or satellite broadcast network. The media device is further configured to receive information about the received media content events, such as program titles, show times and channels, reviews, ratings, and the like. The social networking facilitator manages interactions between a user (or viewer) of the media device and one or more social networks of which the user is a member. In doing so, the social networking facilitator integrates social networking with or into the broadcast viewing experience.

In one embodiment, as a user views a media content event presented by the media device, the user can indicate a desire to notify members of his social network (e.g., his friends, contacts, connections, links) about the presented media content event. In response, the social networking facilitator automatically populates a message with information about the presented media content event, such as its title, channel, show time, or the like. The user may then further modify the message, such as by including a comment, review, or other information. The social networking facilitator then causes a social networking system to notify members of the user's social network by transmitting the message to the social networking system. In addition or instead, the social networking facilitator may cause a second media device in use by one of the members of the user's social network to perform various functions, such as displaying the transmitted message or some portion thereof, initiating recording of the media content event, obtaining the media content event from an alternate source, or the like.

Figure 1:
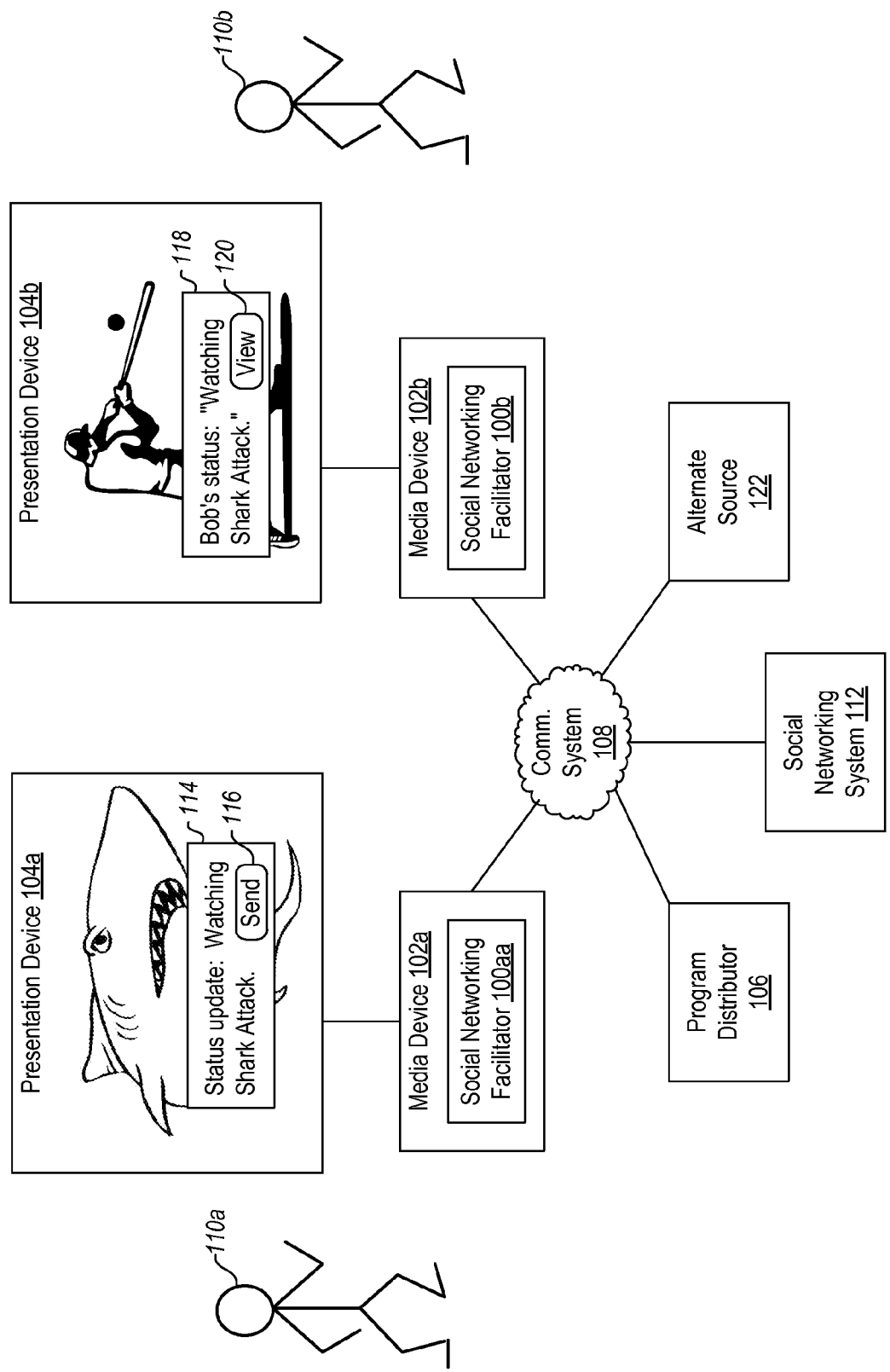
FIG. 1 is a block diagram illustrating interactions between two social networking facilitators according to an example embodiment.

FIG. 1 is a block diagram illustrating interactions between two social networking facilitators according to an example embodiment. In particular, FIG. 1 shows two social networking facilitators 100a and 100b respectively executing on media devices 102a and 102b. Media devices 102a and 102b are respectively communicatively coupled to presentation devices 104a and 104b. The media devices 102a and 102b are configured to receive media content events from program distributor 106 via communications system 108. The media devices 102a and 102b present received media content events on their corresponding presentation devices 104a and 104b. The media devices 102a and 102b are respectively operated by users 110a and 110b.

The social networking facilitators 100a and 100b manage or otherwise facilitate interactions between users 110a and 110b and their respective social networks. In this example, users 110a and 110b are members of the same social network, such as by being friends, connections, links, or otherwise related in a social network represented by social networking system 112. In other embodiments, more than one social networking system 112 may be supported.

In the present example, user 110a is shown currently viewing a media content event about sharks, while user 110b is shown watching a media content event featuring a baseball game. User 110a indicates a desire to notify members of his social network about the media content event that he is currently viewing, such as by pressing a button on a remote control device (not shown), making a menu selection on the presentation device 104a, or similar action. In response, the social networking facilitator 100a automatically populates and displays a message 114 with information about the currently viewed media content event. For example the message 114 may be formatted by the social networking facilitator 100a to include the title ("Shark Attack") of the media content event.

User 110a can then review and optionally modify the message 114 prior to instructing the social networking facilitator 100a to transmit the message. In this example, the message 114 includes a send button 116 operable to initiate transmission of contents of the message 114. Upon selection of the send button 116 (or some similar action) the social networking facilitator 100a transmits the message 114 or contents thereof via the communication system 108 to the social networking system 112. Thereby, the social networking facilitator 100a causes the social networking system 112 to notify other members of the social network of user 110a, such as user 110b.

Upon receiving the transmitted message 114, the social networking system 112 notifies user 110b. In this example, the social networking system 112 notifies the social networking facilitator 100b of media device 102b, which in turn displays a notification 118 on the presentation device 104b. The notification 118 includes information from the message 114, such as the title of the media content event ("Shark Attack") being watched by user 110a. In addition, the notification 118 includes an action button 120. The user 110b may select the action button 120 in order to view the media content event described in the notification 118.

Various other or additional actions may be taken by the social networking facilitator 100b in response to notifications about media content events received from the social networking system 112. In one embodiment, the social networking facilitator 100b may automatically initiate or schedule a recording of a media content event identified by a notification. In another embodiment, the social networking facilitator 100b may facilitate the posting of a response or other communication by the user 110b.

In another embodiment, the social networking facilitator 100b may automatically obtain a media content event identified by a notification from an alternate source 122. For example, the alternate source 122 may be a streaming or on-demand video source, such as a Web site or other Internet-accessible source operated by a movie studio, a television network, or some other entity. When the media content event is not currently available from the program distributor 106, or when the social networking facilitator 100b is executing on a device that cannot access content from the program distributor 106, the social networking facilitator 100b may obtain the identified media content event from the alternate source 122.

Obtaining a media content event from the alternate source may include first determining or identifying the alternate source 122. In one embodiment, the notification transmitted to the social networking facilitator 100b includes an identifier (e.g., URL, URI, link, network address) of the alternate source 122. In other embodiments, the social networking facilitator 100b performs a search to automatically determine one or more alternate sources that can provide the media content event.

Various actions are contemplated when user 110b is not watching the presentation device 104b or utilizing the media device 102b when the message 114 is transmitted to the social networking system 112. In one embodiment, the message 114 is saved, stored, or queued at some location, such as the social networking system 112 and/or the media device 102b. Then, at some later time when the user 110b operates the media device 102b (or some other device), the message 114 will be delivered and/or presented to the user 110b.

Each of the illustrated media devices 100a and 100b is a set-top box ("STB"). In other embodiments, each of the media devices 100a and 100b is or includes a television ("TV"), a digital video disc ("DVD") player, a DVD recorder, a game playing device, or a personal computer ("PC"). As noted, the media devices 100a and 100b receive media content events from the program distributor 106 via the communication system 108. The communication system 108 may include many different types of communication media, now known or later developed. Non-limiting media examples include telephony systems, the Internet, internets, intranets, cable systems, fiber optic systems, microwave systems, asynchronous transfer mode ("ATM") systems, frame relay systems, digital subscriber line ("DSL") systems, radio frequency ("RF") systems, and satellite systems. In some embodiments, each of the media devices 100a and 100b includes multiple communication ports, such as a first port for receiving an RF signal (e.g., from a satellite or terrestrial broadcast system) from the program distributor 106 and a second port (e.g., Ethernet) for communicating with other systems, such as the social networking system 112 and/or alternate source 122, via the Internet or other networks.

The social networking system 112 may include one or more computing systems that represent a network or graph comprising two or more related persons or organizations. Persons may be related as friends, acquaintances, associates, colleagues, professional contacts, group membership (e.g., political party), common interest (e.g., followers of a band), or the like. Existing examples of social networking systems include those operating under the names Facebook, Twitter, LinkedIn, Orkut, and the like. Users may be identified or authenticated to the social networking system 112 in various ways. In some cases, the social networking facilitator 100a receives credentials (e.g., username and password) from the user 110a and transmits them to the social networking system 112. The social networking facilitator 100a may cache or store one or more sets of user credentials so that multiple users can conveniently access or otherwise interact with the social networking system 112.

Media content events may include movies, news programs, sporting events, serial comedies or dramas, and other program events that are communicated to the media devices 102a and 102b. Media content events may include video data, audio data, text, and/or computer instructions.

The described techniques are not limited to the particular architecture shown in FIG. 1. For example, all or part of the social networking facilitator 100a may reside on a computing system that is remote from the media device 100a. In one embodiment, part of the social networking facilitator 100a resides at the program distributor 106 and/or the social networking system 112. In addition, various types of program distributors 106 are contemplated, including broadcasters of digital and/or analog media content events, such as satellite broadcasters, over-the-air (terrestrial) broadcasters, cable broadcasters, and the like. Also, the program distributor 106 may be or include interactive and on-demand systems, such as Internet video streaming or download services. In yet other embodiments, the media device 100a obtains media content events locally, such as from a storage device on the media device, including a DVD, hard disk, or the like. In this manner, the techniques can be used to facilitate social networking with respect to media content events viewed from a DVD or other local storage.

Also, the techniques described herein are not limited to interacting only with social networking systems. Some embodiments may instead or in addition facilitate the sharing of information about programs within any group of people, whether or not they represent or otherwise establish a social network. For example, the program distributor 106 (e.g., as a satellite or cable broadcaster) may utilize at least some of the described techniques to facilitate sharing of commentary, voting, or other actions with respect to all or some of its subscribers. In this manner, the program distributor 106 can create a "community" comprising its subscribers, where members of the community can interact with one another and/or the program distributor 106.

Figure 2:
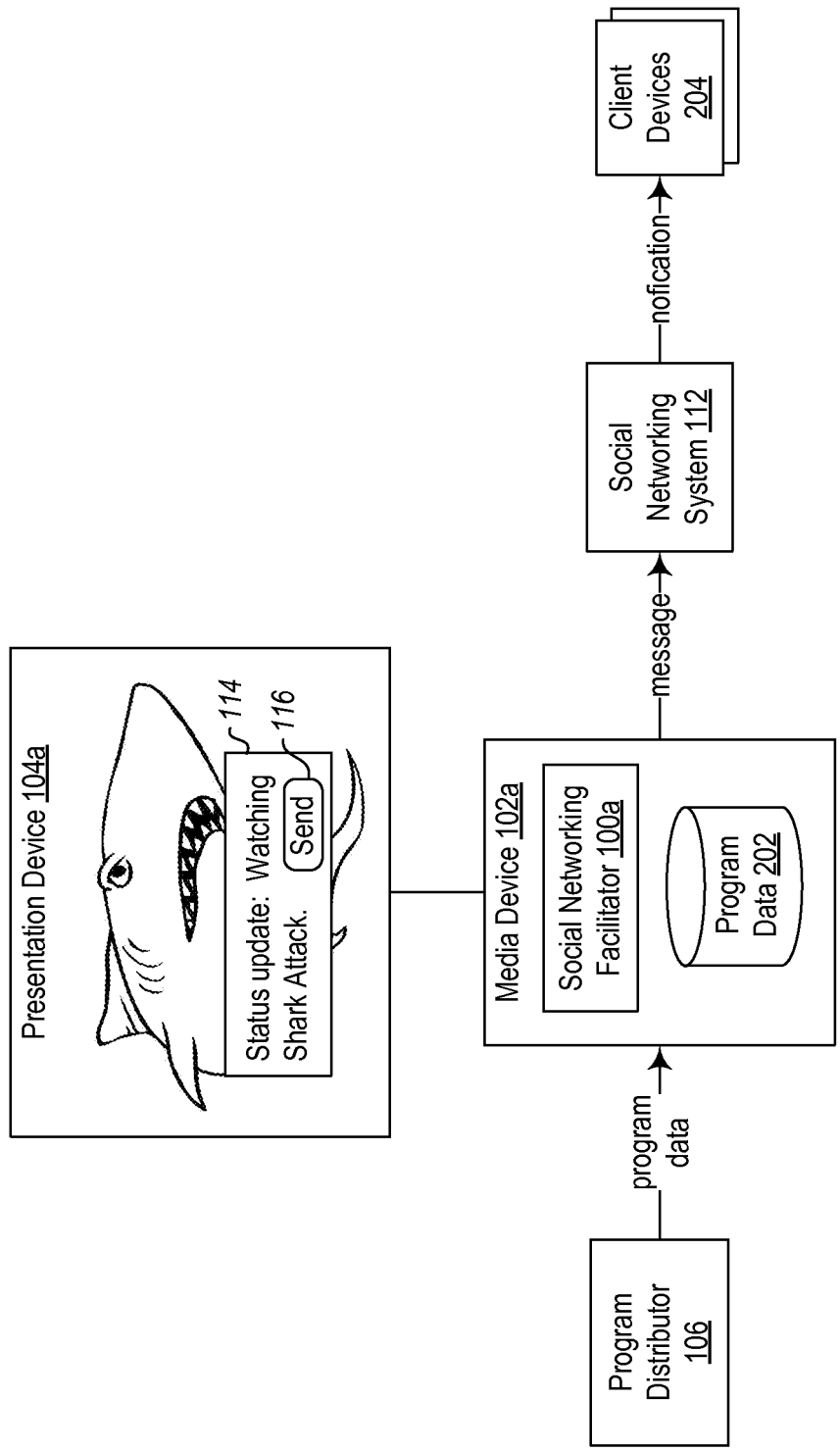
FIG. 2 is a block diagram illustrating operation of an example embodiment of a social networking facilitator.

FIG. 2 is a block diagram illustrating operation of an example embodiment of a social networking facilitator. In FIG. 2, the media device 102a receives and stores or records program data 202. Some program data may be stored only transiently, such as video stored in a buffer for processing (e.g., decryption, display) purposes. Program data 202 may include data that represents a media content event and/or information about that media content event. For example, program data 202 may include one or more MPEG packets that represent video and/or audio associated with a media content event. Program data 202 may also or instead include information (e.g., meta-information) about a media content event, such as electronic program guide information, including an identifier of the media content event (e.g., program identifier), a title of the media content event, a description or summary of the media content event, a quality rating for the media content event (e.g., a "star" rating), a maturity rating for the media content event (e.g., for mature audiences only), a network identifier of an alternate source for the media content event (e.g., a uniform resource locator that identifies a streaming source for the media content event), or the like.

The social networking facilitator 100a automatically populates the message 114 which at least some of the program data 202. For example, if the presentation device 104a is currently showing a media content event entitled "Shark Attack," the social networking facilitator 100a may populate the message 114 with the phrase "Watching shark Attack," as shown. The social networking facilitator 100a may also include other information about the media content event in the message 114. For example, the social networking facilitator 100a may include other electronic program guide information, such as channel and/or show times in the message 114, even though such information may not be displayed or otherwise presented on presentation device 104a. In some embodiments, the social networking facilitator 100a may include a portion of the media content event itself in the message 114, such as by including a snippet, clip, or preview of the media content event.

Also, the social networking facilitator 100a may include in the message 114 an instruction or command configured to cause a remote media device or other computing system to perform some action, such as initiating a recording of the media content event identified by the message 114. Such an instruction may be represented in various ways. In one embodiment, the message itself may include a script (e.g., JavaScript) or other commands that are interpreted when received by the remote device.

Upon selection of the send button 116 or the occurrence of some other action, the social networking facilitator 100a transmits the message 114 and/or contents thereof to the social networking system 112. In response, the social networking system 112 notifies one or more client devices 204. The client devices 204 may include any computing device capable of interacting with the social networking system 112, including media devices such as media device 102b (FIG. 1), personal computers, laptop computers, mobile devices (e.g., smart phones, tablet computers), or the like. Notifying a client device 204 may include transmitting a message, such as an email, text message, or the like. In other situations, notifying the client device 204 may include responding to a request, such as an HTTP request transmitted from the client device 204 to the social networking systems 112.

A client device 204 may include some logic configured to process or take other actions in response to notifications about media content events. As discussed with respect to FIG. 1, the media device 102b (operating as a client device 204) includes a social networking facilitator 100b that is configured to take various actions in response to the received notification. Other types of client devices 204, such as smart phones, may also include a social networking facilitator or similar module (e.g., a mobile application or "app") that is configured to process a received notification identifying a media content event, and take various actions in response thereto, such as presenting information from the received notification, presenting the identified media content event, recording the identified media content event, or the like.

Figure 3A:
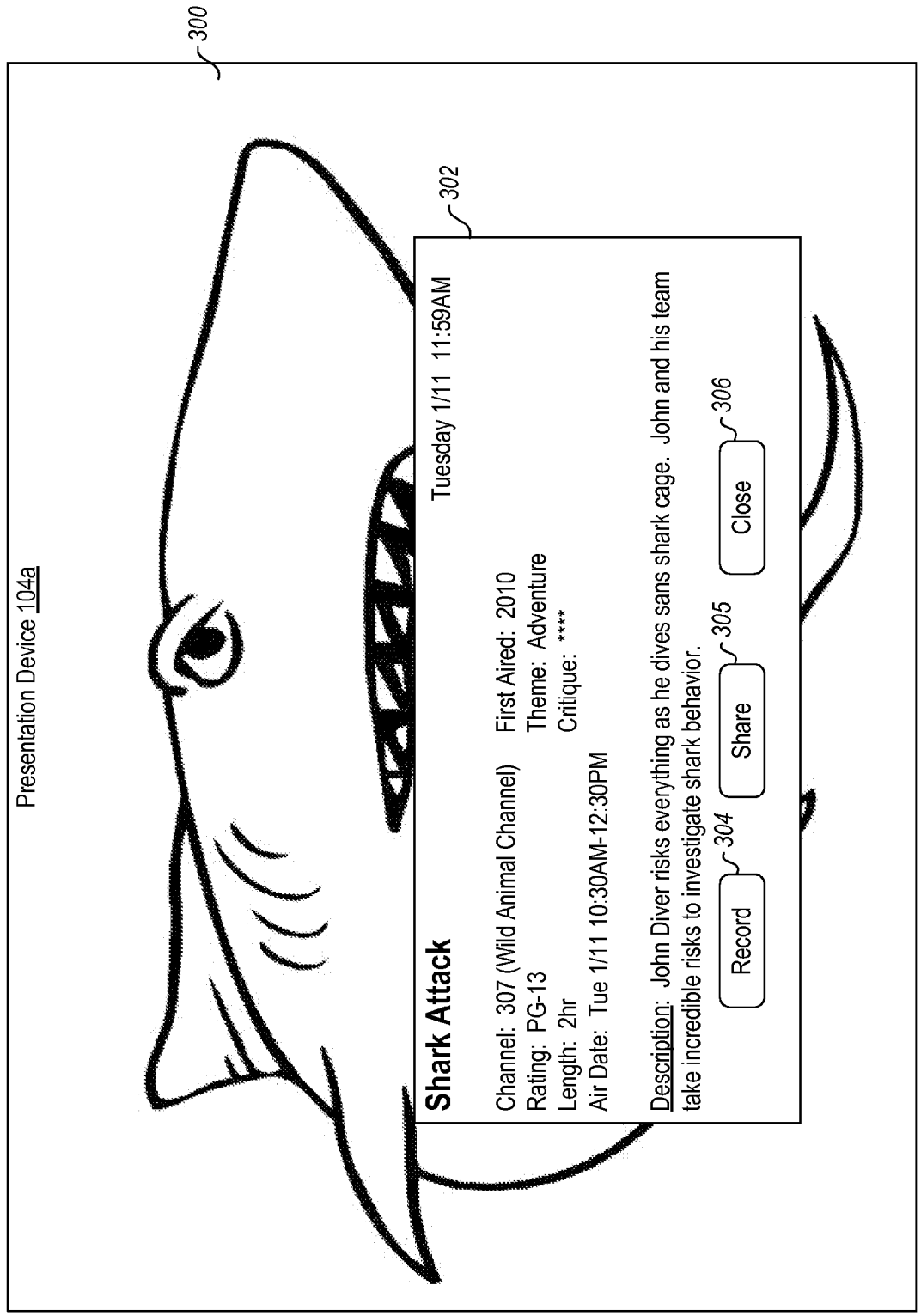

FIGS. 3A-3E illustrate example user interface screens provided by example embodiments. In particular, FIG. 3A shows a scene from a media content event 300 displayed on presentation device 104a and being watched by a first user (e.g., user 110a). In the example of FIGS. 3A-3C, the first user shares information about the media content event 300 with a second user who is a member of the first user's social network.

In FIG. 3A, the first user has requested a program information window 302 be displayed, such as by pressing an appropriate button on a remote-control device. The program information window 302 displays information about the media content event 300. The displayed information includes a title ("Shark Attack"), channel number, maturity rating ("PG-13"), program length ("2 hr"), program date and time, program theme or category, program description, and the like. The displayed information may also or instead include information regarding the media content event that is obtained from one or more social networking systems. For example, the displayed information may include a social network rating (e.g., likes or dislikes posted with respect to the media content event), one or more messages (e.g., recent tweets or other posts) about the program, or the like.

The program information window 302 also includes controls 304-306. Control 304 is configured to initiate recording of the media content event 300. Control 305 configured to facilitate social networking with respect to the media content event 300. In particular, when the first user selects control 305 a message composition window will be presented, as described further with respect to FIG. 3B, below. Control 306 is configured to close the program information window 302.

FIG. 3B shows a message composition window 310 displayed upon presentation device 104a. The message composition window 310 is displayed in response to an input received from the first user, such as the selection of control 305 described above. In other embodiments, a remote-control device operated by the first user may include a button (e.g., a "social-networking button") that can be used to initiate display of message composition window 310 or other user interface elements for interacting with a social network. The message composition window 310 is configured to facilitate the generation of a message about media content event 300. The message composition window 310 is automatically populated with information about the media content event 300, such as its title and channel.

The message composition window 310 may also or instead be populated with other information, possibly obtained from other sources, such as information about the service (e.g., subscription package) or platform (e.g., type of set-top box) used to create the message. Other sources of information are also contemplated, such as from the social network itself. For example, the message composition window 310 may include messages, updates, or reactions posted by other members of the social network with respect to the media content event. In this way, the first user can easily see and respond to current discussions regarding the media content event.

The message composition window 310 also includes controls 311-316 that are operable by the first user to configure, send, or cancel the message. Control 311 is a text box in which the first user can type a message or other comment about the media content event 300. Control 312 is quality rating selector that can be operated by the first user to indicate a rating for the media content event 300, such as a number of stars, a numerical rating, or an indication of a like or dislike (e.g., a thumbs-up or thumbs-down). Control 313 is a checkbox operable by the first user to indicate that the media content event 300 or a future broadcast thereof is to be automatically added to a recording queue of a remote media device operated by, or associated with, a member of the first user's social network. Control 314 is operable by the first user to indicate that a video clip from the media content event 300 is to be included in the message. When the first user is satisfied with his composition of the message via the message composition window 310, the first user can select control 315 to transmit the message to one or more social networking systems utilized by the first user. Alternatively, if the first user elects not to share information about the media content event 300, the first user can select control 316 to cancel the current operation.

FIG. 3C shows a confirmation window 320 displayed upon presentation device 104a. The confirmation window 320 is displayed in response to the transmission of a message to a social networking system, as occurs upon the first user's selection of control 315 described above. In some embodiments, no confirmation is given when a message is transmitted or other function is performed.

FIG. 3D shows a scene from a media content event 350 displayed on presentation device 104b and being watched by a second user (e.g., user 110b). The second user is a member of a social network of the first user described with respect to FIGS. 3A-3C, above. In the example of FIGS. 3D-3E, the second user is notified of the media content event 300 shared by the first user as described above with respect to FIGS. 3A-3C.

In particular, FIG. 3D shows a notification window 360 displayed upon the presentation device 104b. The notification window 360 includes information about the media content event 300 that was shared via the message transmitted by the first user. The notification window 360 includes the title of the media content event 300, its channel, and the comment composed by the first user ("Check out the teeth on this thing!"). The notification window 360 may in some embodiments be displayed automatically (e.g., popped up) in response to receipt of a notification from a social networking system. In other embodiments, the notification widow 360 may be displayed in response to a request from the second user, such as a request to view recent notifications.

The notification window 360 also includes controls 361-363. Control 361 is operable by the second user to view the media content event 300 identified by the notification window 360. For example, upon selecting the control 361, the identified media content event 300 will be displayed on the presentation device 104b. Control 362 is operable by the second user to respond to the notification received from the first user. For example, upon selecting the control 362, a message window or other user interface control may be displayed on presentation device 104b. The second user can then use that message window to compose a response that will be transmitted to the first user (and/or other users) via the social networking system or some other mechanism (e.g., email, text message). Control 363 is operable by the second user to close or hide the notification window 360.

FIG. 3E shows a picture-in-picture ("PIP") window 370 displayed upon presentation device 104b. The window 370 may be displayed in response to selection of the control 361 described above. The window 370 displays a scene from the media content event 300. Other types of presentation windows or controls may also or instead be used to display the scene, including a picture-on-picture display, a side-by-side display, a split screen display, a banner, or the like.

The displayed scene shown in window 370 may be obtained in various ways. In some embodiments, such as when the notification is receive while the media content event 300 is currently being broadcast by a broadcast system, a media device coupled to the presentation device 104b may receive the media content event 300 from the broadcast system. Such a situation may arise when, for example, the first and second users are concurrently watching media content events on their respective presentation devices, or when the second user is later viewing media content events during a later transmission or broadcast of the media content event 300.

In other situations, the media content event 300 may be obtained from a local storage medium. For example, the media content event 300 may have been previously recorded by an associated media device, such as when the first user indicated such via control 313 (FIG. 3B).

In some embodiments, the presentation device 104b is not operable to receive or display media content events from a broadcast system. For example, the presentation device 104b may be the display of a smart phone and be unable to obtain media content events directly from a broadcast system, such as a satellite or cable broadcast system. In such situations, the media content event 300 may be obtained from alternate sources, such as a Web site that provides the media content event 300, a file sharing service that hosts or facilitates access to the media content event 300, or the like.

The techniques described herein are not limited to the specific example user interface controls and information is described with respect to FIGS. 3A-3D, above. For example, the windows (e.g., windows 302, 310, 320, 360, 370) may include any suitable information of interest, including more or less information, or information of different types. Furthermore, any number or type of controls may be included as part of the windows (e.g., 302, 310, 320, 360, 370). For example, some embodiments do not include one more of controls 304-306, 311-316, or 361-363; some embodiments provide a menu instead of a button for control 305 (e.g., to select one of a number of different social networking systems); some embodiments include a virtual keyboard for composing or responding to messages; and the like.

In addition, some embodiments facilitate social networking in other ways. For example, one embodiment includes an "inbox," which displays an index or other indications of recently received notifications or messages from a social networking system. Another embodiment includes a message composition feature that can be used by a user to compose a message that is not necessarily related to a media content event. A further embodiment facilitates sending or receiving messages with respect to a social networking identity that is associated with a current media content event. For example, many media content events have associated social network identity or account, which allows other users to follow or otherwise obtain information about the media content event (e.g., information about an upcoming season). In such cases, the described techniques can also or instead be applied to facilitate interaction with social networking identities corresponding to media content events.

Furthermore, some embodiments may provide or include voting functionality that is integrated with one or more social networking systems. For example, a voting window may be displayed in response to a user input, with which the user may indicate a like or dislike (e.g., a thumbs-up or thumbs-down, a number of stars) for currently-viewed media content event. The voting window may be automatically populated with information about the media content event, such as title and channel. After indicating her vote, the user can transmit the vote to a corresponding social networking system (or some other vote-collecting system) that tallies received votes and makes information about votes accessible to other users. In this manner, the described techniques can be used to facilitate voting for reality programming (e.g., talent programs, desert island competitions), wherein viewers participate in broadcast media content events by voting keep or discard particular participants.

In some embodiments, electronic program guide information about a media content event may be modified to include voting information that specifies the number, type, and character of voting that is associated with the media content event. Example voting information obtained from the electronic program guide may specify one or more candidate names (e.g., "Jack," "Jill") or other options from which the voter is to select, along with a voting time window (e.g., during the last 10 minutes of the media content event) and the like. Voting information may of course also or instead be obtained from another source, such as a social networking system or some other third party.

In addition, although media content events are primarily discussed herein as being received from a broadcast system, other types of delivery mechanisms are contemplated. For example, some embodiments facilitate social networking with respect to media content events received from the Internet, other public IP networks, private networks (e.g., serving resorts or hotels), or the like.

Figure 4:
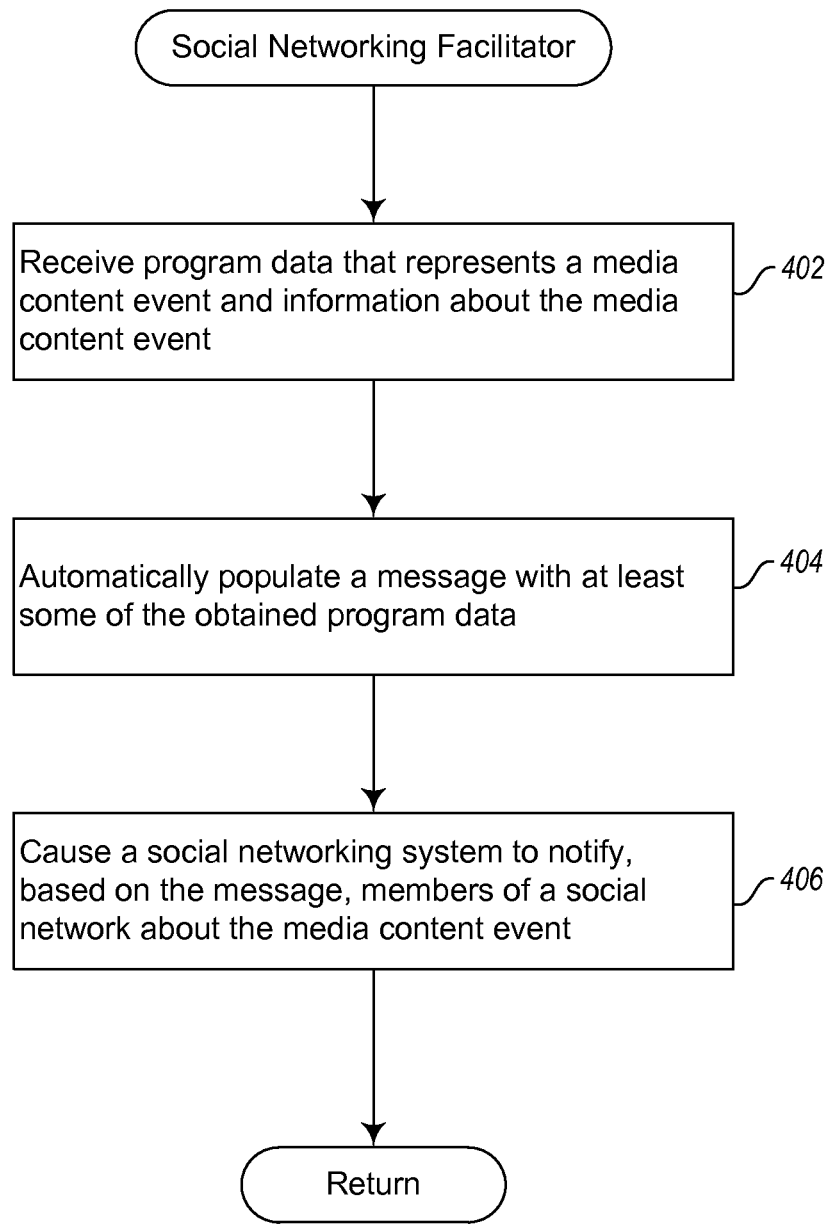
FIG. 4 is a flow diagram of a social networking facilitator process provided by an example embodiment.

FIG. 4 is a flow diagram of a social networking facilitator process provided by an example embodiment. The illustrated process may be provided or performed by, for example, one or more components of a social networking facilitator. The illustrated process facilitates interactions between a user and a social networking system with respect to a media content event.

The process begins at block 402, where it receives program data that represents a media content event and information about the media content event. The program data may be received from a broadcast system such as a satellite broadcast network, a cable broadcast network, a terrestrial ("over-the-air") broadcast network, or the like. The received program data may represent the media content event itself, such as by including video or audio information that is part of the media content event. The received program data may represent information about the media content event, such as by including electronic program guide information about the media content event. In some embodiments, the program data may be received from multiple sources. For example, program data representing the media content event (e.g., video data) may be received from a first source, such as a satellite broadcast network, whereas the program data representing information about the media content event may be received from a second source, such as a Website, a social networking system, network-accessible database, or the like.

At block 404, the process automatically populates a message with at least some of the obtained program data. Automatically populating the message may include modifying the message to include information about the media content event and/or a portion of the media content event itself. The message may then be displayed within a user interface control (e.g., a form) that is operable by a user to edit and/or transmit the message.

In another embodiment, the process may here generate (e.g., create, format, define) and/or present (e.g., display, pop up) a user interface control, such as a form that may include at least some of the obtained program data, such as the title or channel of the media content event. The process may then receive user input that is responsive to the presented user interface control, such as a comment, a like/dislike, a rating, or the like. The process may then generate (e.g., create, modify, form) a message that includes both the at least some of the obtained program data (e.g., the title) and the received user input.

At block 406, the process causes a social networking system to notify, based on the message, members of a social network about the media content event. In one embodiment, causing the social networking system to notify members includes transmitting the message to the social networking system as a status or profile update for access by members of a social network. In some embodiments, the process accesses the social networking system via an application program interface that utilizes credentials such as a username and/or password to access a user account.

The process may perform other functions in addition to, or instead of, those described above. In particular, the process may cause a client device that is used by, or associated with, a member of the user's social network to perform various functions. As one example, the process may cause the client device to display information from the transmitted message, such as by popping up a notification window or other user interface element. As another example, the process may cause the client device to obtain and/or record a media content event identified by a transmitted message, such as by including an instruction to do so in the transmitted message.

The process may also perform functions in response to notifications received from social networking systems. For example, the process may receive from a social networking system a notification of a media content event, and in response, perform various actions. The actions performed in response to a received notification may include displaying information about the media content event, displaying the media content event itself, obtaining the media content event, recording the media content event, or the like.

Other embodiments may provide a process for execution on a client device (e.g., smart phone, tablet computer, desktop computer) operated by a user, to facilitate interaction with a social networking system and optionally a media device (e.g., set-top box) operated by the user. In particular, the client device may receive a notification identifying a media content event, such as a notification that is received from a social networking system and that is based on a message transmitted to the social networking system as described with reference to FIG. 4. As noted, the notification (e.g., status or profile update) may identify a media content event viewed by a member of the user's social network. The user can then provide input to the client device to cause one or more actions to be performed, including displaying the media content event on the client device, displaying the media content event on a presentation device of the media device operated by the user, recording the media content event on a storage device of the media device operated by the user. Thus, in one scenario, such as when the user is concurrently operating his client device (e.g., a smart phone or tablet computer) and watching television, the user can, in response to a notification received on his client device, cause his set-top box to display on his television a media content event identified by the notification. In another scenario, such as when the user is on the road and wishes to record a media content event at his home for later viewer, the user can, in response to a notification received on his smart phone or tablet computer, cause his set-top box DVR to record a media content event identified by the notification.

Figure 5:
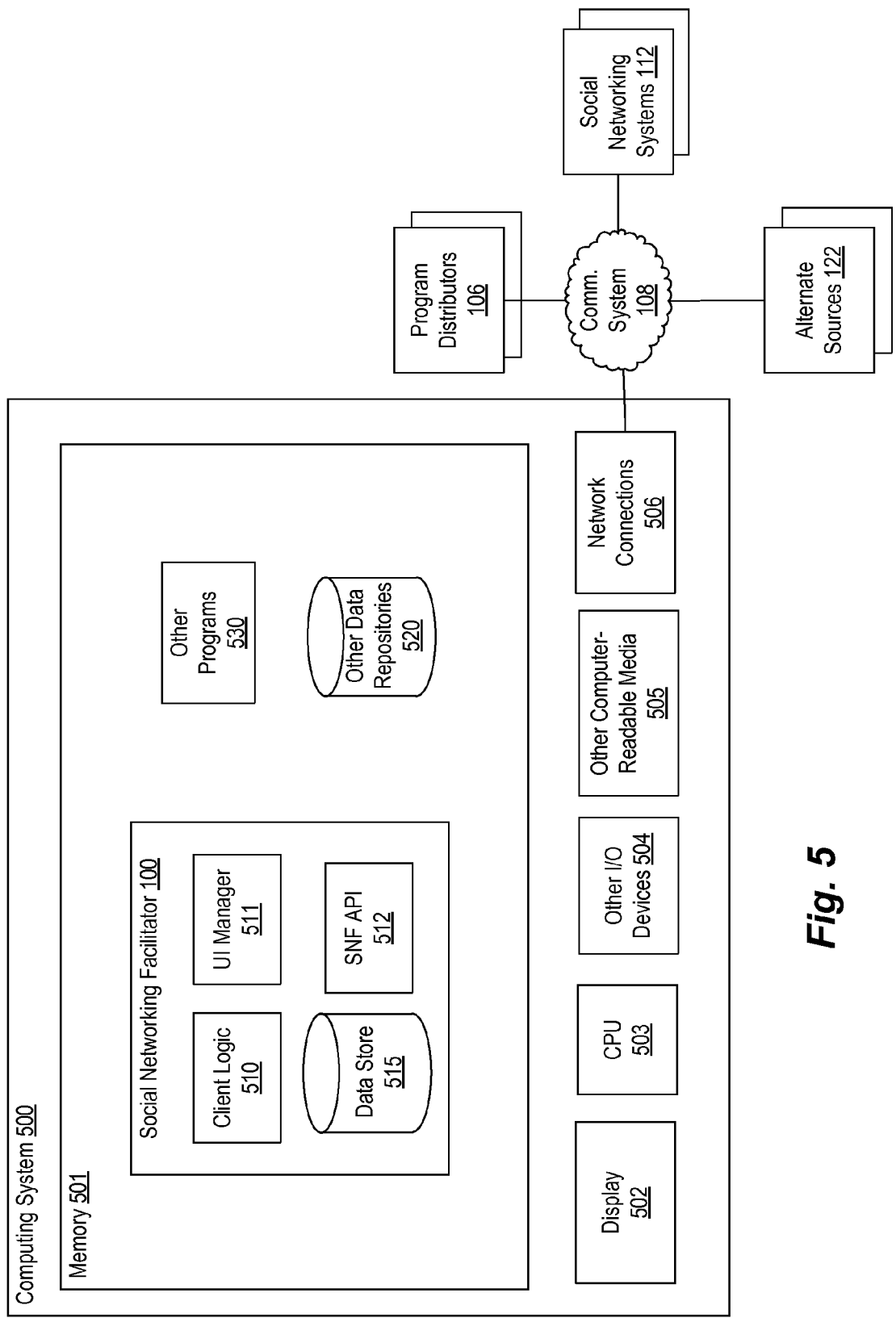
FIG. 5 is a block diagram of a computing system for practicing example embodiments of a social networking facilitator.

FIG. 5 is a block diagram of a computing system for practicing example embodiments of a social networking facilitator. FIG. 5 shows a computing system 500 that may be utilized to implement a social networking facilitator 100. In one embodiment, the computing system 500 is part of a set-top box or other media device 102 configured to receive and display media content events on a presentation device 104. In other embodiments, the computing system 500 is part of a presentation device 104, such as a television. In still other embodiments, the computing system 500 is part of a mobile computing device, such as a smart phone or tablet computer.

In the embodiment shown, the computing system 500 comprises a computer memory ("memory") 501, a display 502, one or more Central Processing Units ("CPU") 503, Input/Output ("I/O") devices 504 (e.g., audio processor, video processor, keyboard, mouse, CRT or LCD display cards or drivers, and the like), other computer-readable media 505, and network connections 506. The social networking facilitator 100 is shown residing in memory 501. In other embodiments, some portion of the contents, some of, or all of the components of the social networking facilitator 100 may be stored on and/or transmitted over the other computer-readable media 505. The components of the social networking facilitator 100 preferably execute on one or more CPUs 503 and facilitate interaction with a social networking system, as described herein. Other code or programs 530 (e.g., an audio/video processing module, an electronic program guide manager module, a Web browser or server, and the like) and potentially other data repositories, such as data repository 520, also reside in the memory 501, and preferably execute on one or more CPUs 503. Of note, one or more of the components in FIG. 5 may not be present in any specific implementation. For example, some embodiments may not provide other computer-readable media 505 or a display 502.

The illustrated social networking facilitator 100 includes client logic 510, a user interface ("UI") manager 511, a social networking facilitator application program interface ("API") 512, and a data store 515. The client logic 510 includes instructions that are configured to, when executed by the CPU 503, interact with the social networking system 112 to transmit and receive messages and other information, as well as other functions described herein.

The UI manager 511 provides a view and a controller that facilitate user interaction with the social networking facilitator 100 and its various components. For example, the user interface manager 515 provides interactive graphical user interface elements such as those discussed with respect to FIGS. 3A-3E. As discussed, such user interfaces are operable by users to interact with social networking systems with respect to media content events.

The API 512 provides programmatic access to one or more functions of the social networking facilitator 100. For example, the API 512 may provide a programmatic interface to one or more functions of the social networking facilitator 100 that may be invoked by one of the other programs 530 or some other module. In this manner, the API 512 facilitates the development of third-party software, such as user interfaces, plug-ins, news feeds, adapters (e.g., for integrating functions of the social networking facilitator 100 into Web applications), and the like.

In addition, the API 512 may be in at least some embodiments invoked or otherwise accessed via remote entities, such as code executing on a remote client device, to access various functions of the social networking facilitator 100. For example, the social networking system 112 may push notifications about media content events (or other information) to the social networking facilitator 100 via the API 512. The API 512 may also be configured to provide code modules that can be integrated into third-party applications and that are configured to interact with the action social networking facilitator 100 to make at least some of the described functionality available within the context of other applications.

The data store 515 may be used to store various types of information used by the social networking facilitator 100. For example, the data store 515 may store user credentials, received notifications or messages, user settings or preferences, or the like. Program data (e.g., video data, audio data, electronic program guide information) may be stored in the data store 515 and/or the other data repositories 520.

In an example embodiment, components/modules of the social networking facilitator 100 are implemented using standard programming techniques. For example, the social networking facilitator 100 may be implemented as a "native" executable running on the CPU 503, along with one or more static or dynamic libraries. In other embodiments, the social networking facilitator 100 may be implemented as instructions processed by a virtual machine that executes as one of the other programs 530. In general, a range of programming languages known in the art may be employed for implementing such example embodiments.

In addition, the embodiments described above may also be structured in various ways, including but not limited to, multiprogramming, multithreading, client-server, or peer-to-peer, running on one or more computer systems each having one or more CPUs. Some embodiments may execute concurrently and asynchronously, and communicate using message passing, pipes, signals, or other communication techniques. Also, other functions could be implemented and/or performed by each component/module, and in different orders, and by different components/modules, yet still achieve the described techniques.

Furthermore, in some embodiments, some or all of the components of the social networking facilitator 100 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be non-transitorily stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

It should be emphasized that the above-described embodiments of the social networking facilitator 100 are merely possible examples of implementations of the described techniques. Many variations and modifications may be made to the above-described embodiments. All such modifications and variations are intended to be included herein within the scope of this disclosure and protected by the following claims.

The invention claimed is:

1. A method for facilitating interaction with a social networking system via a first media device operated by a user, comprising:
   receiving from a broadcast system program data that represents a media content event and information about the media content event;
   generating a message that includes the at least some of the obtained program data and user input regarding the obtained program data;
   transmitting the message to the social networking system, thereby causing the social networking system to notify members of a social network of the user about the media content event; and
   causing a second media device associated with one of the members of the social network to record the media content event, by including in the transmitted message an instruction to record the media content event.

2. The method of claim 1, further comprising:
   causing the second media device associated with one of the members of the social network to display the at least some of the obtained program data from the transmitted message.

3. The method of claim 1, further comprising:
   causing the second media device associated with one of the members of the social network to display the media content event.

4. The method of claim 1, further comprising:
   causing a computing device associated with one of the members of the social network to obtain the media content event from a source other than the broadcast system.

5. The method of claim 4 wherein causing the computing device to obtain the media content event from a source other than the broadcast system comprises:
   causing the computing device to obtain the media content event from a source that streams the media content event.

6. The method of claim 1, further comprising:
   presenting a user interface control that is automatically populated with at least some of the obtained program data; and
   receiving the user input responsive to the presented user interface control.

7. The method of claim 1, further comprising:
   automatically determining a source for the media content event other than the broadcast system; and
   including in the generated message a network identifier of the source for the media content event other than the broadcast system.

8. The method of claim 1, wherein the instruction to record the media content event includes commands that are interpreted by the second media device.

9. A system for facilitating interaction with a social networking system via a media device operated by a user, comprising:
   a first media device configured to:
      receive from a broadcast system program data that represents a media content event and information about the media content event;
      automatically populate a message with at least some of the obtained program data and user input regarding the obtained program data;
      transmitting the message to the social networking system, thereby causing the social networking system to notify members of a social network of the user about the media content event; and
      cause a second media device associated with one of the members of the social network to record the media content event, by including in the transmitted message an instruction to record the media content event.

10. The system of claim 9, wherein the first media device is further configured to:
    present a user interface control; and
    receive the user input responsive to the user interface control, wherein the user interface control is a form and wherein the at least some of the obtained program data includes at least one of: a title of the media content event, a unique identifier of the media content event, a description of the media content event, a rating for the media content event, a portion of the media content event, and a network identifier of an alternate source for the media content event.

11. The system of claim 9 wherein the first media device is further configured to:
    receive input from the user including at least one of: an indication of a like or dislike for the media content event, a comment about the media content event, and a rating of the media content event.

12. The system of claim 9, further comprising:
    the second media device configured to:
       receive from the social networking system a notification of the media content event; and
       in response to the received notification, display information about the media content event.

13. The system of claim 9, further comprising:
    a computing device configured to:
       receive from the social networking system a notification of the media content event; and
       in response to the received notification, obtain the media content event from a source other than the broadcast system.

14. The system of claim 13 wherein the first media device is further configured to:
    determine the source other than the broadcast system; and
    include in the transmitted message a network identifier identifying the source other than the broadcast system.

15. The system of claim 13 wherein the computing device is further configured to:
    automatically determine the source other than the broadcast system.

16. A method for facilitating interaction with a social networking system via a client device operated by a user, comprising:
    receiving, at the client device, a notification from the social networking system, the notification identifying a media content event provided by a broadcast system and viewed on a first media device by a member of a social network of the user, the notification based on a message transmitted to the social networking system from the first media device, wherein the client device is not operable to obtain the media content event from the broadcast system;

receiving user input responsive to the received notification; and obtaining, responsive to the received user input, the media content event from a source that streams the media content event.

17. The method of claim 16, further comprising:

causing a second media device to obtain the media content event from an alternate source.

18. The method of claim 17 wherein the first media device and the second media device are set-top boxes wherein the client device is a mobile computing device, and wherein the method is performed by a mobile application executing on the mobile computing device.

19. The method of claim 16, further comprising:

performing an action based on the received user input, the action being at least one of:
- displaying, on the client device, the media content event obtained from the source that streams the media content event;
- displaying, on a presentation device coupled to a second media device, the media content event obtained from the source that streams the media content event; and
- recording, on a storage device of the second media device, the media content event obtained from the source that streams the media content event.

20. The method of claim 16, wherein obtaining the media content event from the source that streams the media content event comprises:

receiving the media content event from a Website.

* * * * *